Feb. 21, 1967　　　　　　A. J. KNEZ　　　　　　3,305,829
REAR-ALERTING SIGNAL FOR AUTOMOTIVE VEHICLES
Filed March 30, 1964　　　　　　　　　　　　　　2 Sheets-Sheet 1
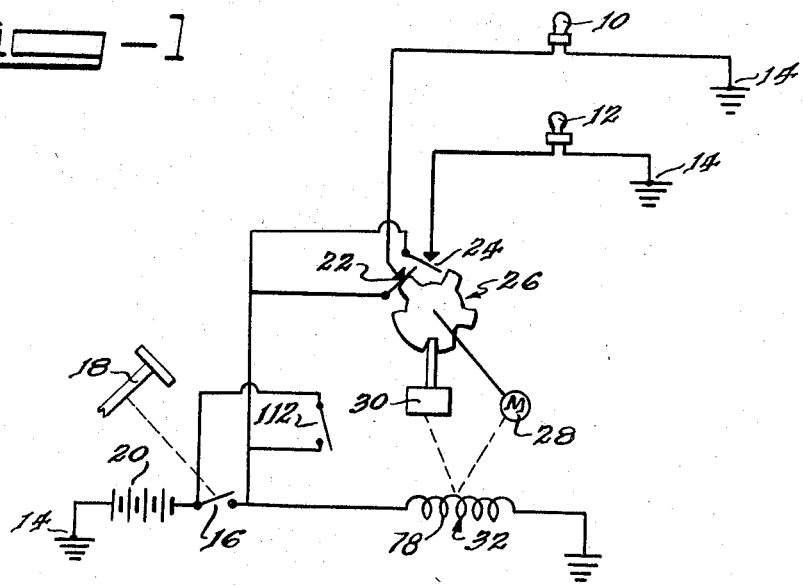
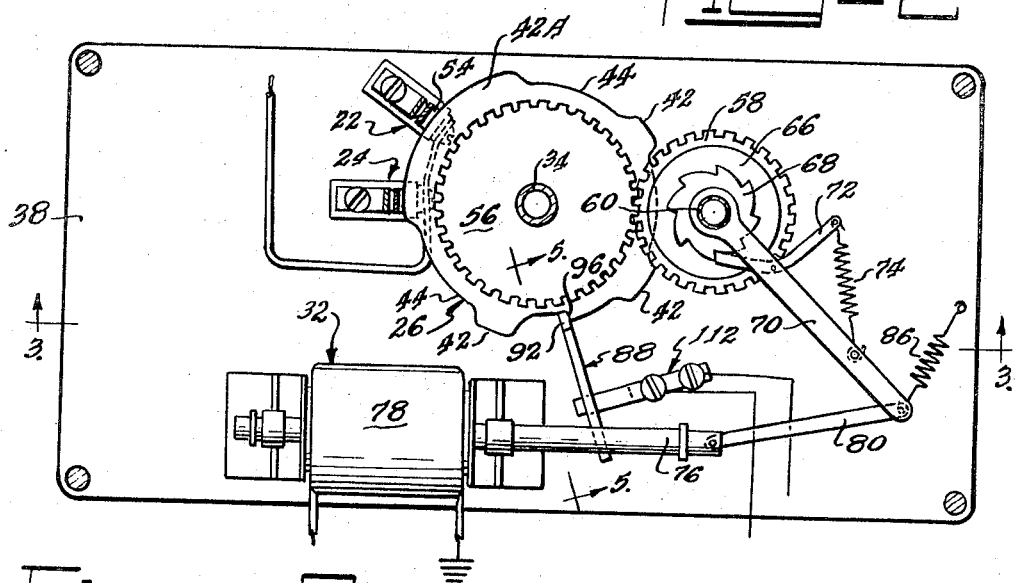
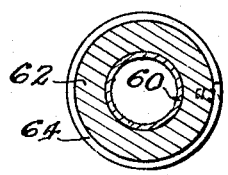
Inventor
By August J. Knez
Stone, Nierman,
Burmeister & Zummer
Attorneys Feb. 21, 1967 A. J. KNEZ 3,305,829
REAR-ALERTING SIGNAL FOR AUTOMOTIVE VEHICLES
Filed March 30, 1964 2 Sheets-Sheet 2
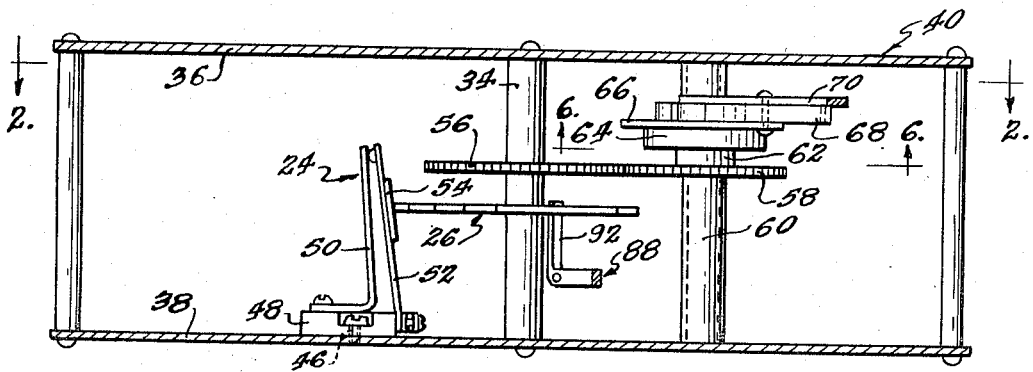
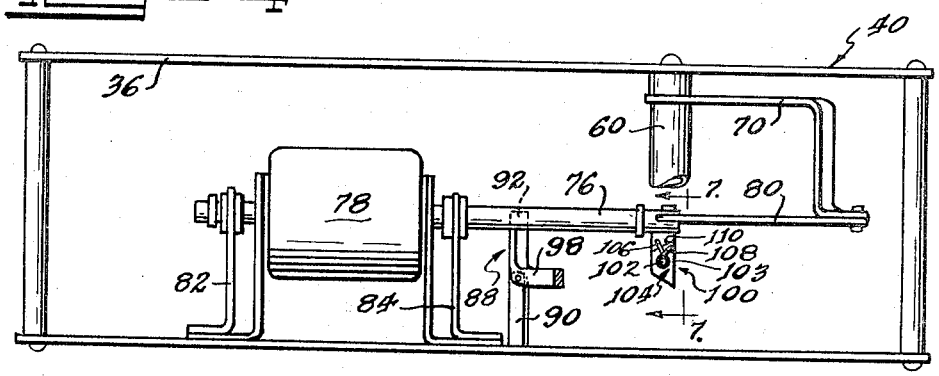
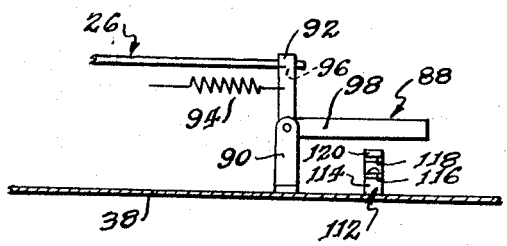
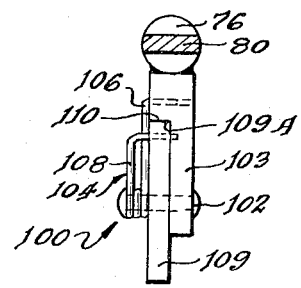
Inventor
August J. Knez
By: Stone, Nierman,
Burmeister & Zummer
Attorneys United States Patent Office 3,305,829
Patented Feb. 21, 1967

3,305,829
REAR-ALERTING SIGNAL FOR
AUTOMOTIVE VEHICLES
August J. Knez, 12600 S. Roma Road,
Palos Park, Ill. 60465
Filed Mar. 30, 1964, Ser. No. 355,855
5 Claims. (Cl. 340—72)

The present invention relates to signalling devices to indicate to a following driver the operative condition of a vehicle.

Rear-end collisions have long been a serious driving hazard. Such rear-end collisions are believed to occur as a result of the maintenance of too small an interval between vehicles for the speed of the vehicles, and driver error. Driver error may occur either from a hypnotic effect or confusion. A hypnotic effect results from constant speed driving in a relatively straight line, such as occurs on modern expressways and highways, and results in the inability of the driver to react rapidly to changes in traffic conditions. Driver confusion often results from distractions, particularly when at night a driver turns his eyes from the vehicle ahead of him during the period in which the driver of the vehicle ahead applies the brakes so that the change of illumination of the preceding vehicle's brake lights from the ordinary tail light condition to the brake signal condition must be determined by a measurement of light magnitude alone.

It is an object of the present invention to provide a rear signal for an automotive vehicle which will provide a superior warning to changes in the operative condition of a vehicle to any following driver. Thus, it is an object of the present invention to provide a rear signalling device for an automotive vehicle which will reduce the frequency of rear end collisions.

One of the most noticeable type of signals utilizing changes in light magnitude is the flashing light, however, too many flashing lights can become a distraction to the driver of a motor vehicle. At the present time, the brake lights of a vehicle are essentially three amplitude indicators, that is, an off indication, a tail light indication, and a brake light indication. If the brake light indication were simply replaced by a flashing lamp, the expressways and major highways would become a sea of flashing red lights. It is believed that this would add to the confusion present in drivers minds as to the operative condition of the cars preceding him down the thoroughfare.

It is thus an object of the present invention to provide a braking signal device for the rear of an automotive vehicle which provides a relatively short period of flashing light followed by a period of constant amplitude light signal.

These and further objects of the present invention will become more readily apparent upon a further consideration of this disclosure, particularly when viewed in the light of the drawings, in which:

FIGURE 1 is a schematic diagram including the electrical circuit of a signalling device for an automotive vehicle according to the present invention;

FIGURE 2 is a sectional view taken along the line 2—2 of FIGURE 3 illustrating a portion of the device schematically illustrated in FIGURE 1;

FIGURE 3 is a sectional view taken along the line 3—3 of FIGURE 2;

FIGURE 4 is an end elevational view of the device of FIGURES 2 and 3;

FIGURE 5 is a sectional view taken along the line 5—5 of FIGURE 2;

FIGURE 6 is a sectional view taken along the line 6—6 of FIGURE 3; and

FIGURE 7 is a sectional view taken along the line 7—7 of FIGURE 4.

FIGURE 1 schematically illustrates the improved signalling device for the rear of an automative vehicle, and it is to be noted that certain of the components of this signalling device are in present day use on motor vehicles. A pair of lamps 10 and 12 are conventionally located at the rear of a motor vehicle and have one terminal connected to the frame 14 of the motor vehicle and the other terminal connected to one terminal of a brake switch 16. The brake switch 16 is actuated by the braking pedal 18 of the vehicle, and the other terminal of the brake switch 16 is connected to one terminal of a storage battery 20. The other terminal of the storage battery 20 is connected to the frame of the vehicle to complete the circuit with the brake lamps 10 and 12. In the conventional motor vehicle, the rear or brake lamps 10 and 12 are simply connected in parallel, and FIGURE 1 differs from the conventional structure in this respect, as well as others.

The lamp 10 is connected in series with the switch 16 by means of a single pole single throw switch 22, and the lamp 12 is connected in series with the switch 16 by means of a single pole single throw switch 24. The switches 22 and 24 are actuated by a rotary cam 26 which is driven by a motor 28 after release by a releasable stop mechanism 30. Both the motor 28 and the releasable stop mechanism 30 are actuated by a solenoid 32. The solenoid 32 is also connected in a series circuit with the switch 16 and the battery, or other source of electromotive force 20.

As illustrated in FIGURES 2 and 3, the cam 26 is mounted on a first spindle 34, the first spindle being rotatably mounted between a pair of plates 36 and 38 which form a housing designated 40. The cam 26 has a plurality of high sectors, that is, sectors at a greater radius from the center of the cam than other sectors, and the high sectors are designated 42 while the low sectors are designated 44. Each of the high sectors 42 is separated from adjacent high sectors by a low sector 44. The switches 22 and 24 are mounted on the plate 38 by a bolt 46 which extends through an insulator 48 of the switch. The switches 22 and 24 are identical in construction and have a first leaf contact 50 mounted on the insulator 48 and a second leaf contact 52 which extends roughly parallel to the first leaf contact 50 and is also mounted on the insulator 48. The second leaf contact 52 is provided with a flat strip 54 of insulating material on the surface thereof confronting the cam 26, and the flat strip 54 rides against the cam 26. When the flat strip 54 engages a high sector 42 of the cam the two contact strips 50 and 52 of the switches 22 and 24 make contact at their ends remote from the insulator 48, but when the strip 54 rides against a low sector 44 of the cam 26, the two strips 50 and 52 are spaced from each other and thereby insulated from each other.

The cam 26 has a rest position which is illustrated in FIGURE 2, and in this rest position a single high sector, designated 42A engages the insulating strips 54 of both switches 22 and 24 to close both switches. In all other positions of the cam 26, a high sector 42 confronts the strip 54 of one of the switches 22 or 24, but not both of the switches, so that one switch or the other is closed.

The cam 26 must rotate one full revolution each time the switch 16 is closed so that the two lamps 10 and 12 will follow an illumination cycle commencing with both lamps on, followed by a period of alternating flashing of lamps 10 and 12, and terminating with both lamps illuminated. Further, the portion of the cycle prior to permanent illumination must be less than five seconds in duration. If the lamps 10 and 12 are permitted to flash for longer periods of time, most braking operations will fail to result in the brake lamps 10 and 12 becoming illuminated at a steady magnitude. It is only necessary for the lamps 10 and 12 to flash for a short period of time, preferably of the order of three to four seconds in order to make certain that any following driver will be alerted to the change of condition of the vehicle, and thereafter continuation of this changed condition may adequately be noted by constant illumination of the lamps 10 and 12. As a result, a minimum of light flashing occurs on actuation of the switch 16 to effect optimum information transfer to the following driver.

The motor 28 which drives the cam 26 is a coiled spring device. A spur gear 56 is mounted on the first spindle 34 and rotates with the spindle, and this spur gear 56 is meshed with a second spur gear 58 which is journaled about a second spindle 60. The second spindle is also mounted between the plates 36 and 38 parallel to the first spindle 34. The second spur gear 58 carries a sleeve 62 which is also journaled about the second spindle 60. A spiral spring 64 is coiled about the sleeve 62 and anchored at its end adjacent to the second spur gear 58 on the sleeve 62. A disc 66 is also journaled about the second spindle 60 on a side of the sleeve 62 remote from the second spur gear 58, and the disc carries a rachet 68 on its surface remote from the sleeve 62. The spring 64 is anchored at its end adjacent to the disc on the disc 66.

An arm 70 is mounted on the second spindle 60 and carries a pawl 72 adapted to engage the rachet 68. The pawl 72 is pivoted centrally on the arm 70 and the end remote from the rachet 68 is coupled to the arm by a spring 74 to provide a spring bias urging the pawl into engagement with the rachet. The arm 70 is coupled to a linear armature 76 of the solenoid 32 by means of a link 80 pivotally connected to the arm 70 at one end and to the armature 76 at the other end. The armature 76 is mounted on the plate 38 by spaced bearings 82 and 84 and is adapted to be translated along its axis in response to an electrical current flowing through the coil 78 of the solenoid 32.

When the switch 16 is closed, current flowing through the solenoid coil 78 translates the armature 76 and rotates the arm 70 to wind the spiral spring 64. This places a torque on the second spur gear 58, and hence the first spur gear 56 to rotate the cam 26. When the switch 16 is opened, a spring 86 retracts the arm 70 and pulls the armature 76 into its rest position, as indicated in FIGURE 2. The ratio of the number of teeth on the first spur gear 56 to the number of teeth on the second spur gear 58 is equal to the ratio of the number of degrees of rotation of the disc 66 to 360 degrees, so that the spring 64 will maintain the same tension even though the arm 70 travels through a relatively small arc (perhaps 60°) while the spur gear 56 travels through exactly 360°.

The cam 26 is physically stopped at its rest position by the stop mechanism 30. The stop mechanism is best illustrated in FIGURES 2 through 5 and utilizes an L shaped arm 88 pivotally mounted at the junction of the legs of the arm on a bracket 90 which is affixed to the plate 38. The arm 88 has one leg 92 which rides in abutment with the edge of the cam 26 and is held in abutment with the edge of the cam 26 by tension provided by a spring 94. The cam 26 is provided with a slot 96 located between two high sectors 42 which provides a stop in the rest position of the cam illustrated in FIGURE 2. The arm 92 rides against the slot 96 to provide positive stopping in the rest position. The other arm 98 of the cam stop member 88 extends essentially normally from the first arm 92 adjacent to the armature 76.

The armature 76 carries an actuator mechanism 100 adjacent to its pivotal connection with the link 80. The actuator mechanism has a pin 102 which extends normally from a plate 103 and carries a spring 104 which is bent about the pin 102. The longer portion of the spring 104, designated 106 is anchored at its end on the plate 103, and the shorter portion of the spring, designated 108, engages a latch 109 in the form of a truncated plate which is rotatably mounted on the pin 102. One edge of the plate 109A engages a shoulder 110 on the actuator plate 103 to provide adequate force to assure disengagement of the cam member 88 from the slot 96 when the armature 76 is translated inwardly. Whenever the switch 16 is opened, the spring 86 returns the armature 76 to its rest position, thus dragging the latch 109 of the actuator 100 over the arm 98 of the cam stop member 88. However, the latch 109 is free to rotate on the pin 102, thereby producing no substantial effect on the position of the cam stop member 88 for return of the armature 76.

If the switch 16 is opened before the cam 26 has made a complete revolution, it is desirable for the cam to continue and complete its revolution since it is desirable for the lamps 10 and 12 to continue flashing for a minimum period of time. For this reason, a by-pass switch 112, illustrated in FIGURE 1, is connected in parallel with the switch 16, and this switch 112 is maintained closed until the cam has completed its rotation. The arm 98 of the cam stop member 88 is utilized to maintain the switch 112 in closed position.

The switch 112 is illustrated mechanically in FIGURES 2 and 5. A block 114 of insulating material is used to mount in insulated relationship two strips 116 and 118 of electrically conducting material. The strips 116 and 118 are disposed generally parallel to the plate 38, and the strip 118 remote from the plate 38 is provided with a layer 120 of electrical insulating material which confronts the arm 98 of the cam stop member 88. When the cam stop member 88 has its arm 92 out of the slot 96, that is, when the arm 92 rides against either a high sector 42 or a low sector 44 of the cam 26, the arm 98 will engage the insulating strip 120 and force the contact strips 116 and 118 into abutment with each other. As soon as the arm 92 of the cam member 88 is engaged within the slot 96, the spring 94 pulls the arm 98 from the insulating strip 120 and permits the contact strips 116 and 118 to become separated to open the by-pass switch 112. This action will occur after the cam 26 completes its revolution.

In the foregoing disclosure, the switch 16 is assumed to be actuated by depressing of the brake pedal 18. The switch 16 may also be actuated by release of the accelerator pedal of the vehicle. Either the brake pedal or the accelerator pedal may be considered to be a speed control for the vehicle, and actuation of the switch responsive to a release of the accelerator or a depression of the brake pedal may be utilized to effect the warning signal.

From the foregoing disclosure, those skilled in the art will readily devise many modifications of the present structure within the intended scope of the present invention. Further, many applications for the present invention beyond that of signalling for automotive vehicles will be apparent from this disclosure to those skilled in the art. It is therefore intended that the scope of the present invention be not limited by the foregoing disclosure, but rather only by the appended claims.

The invention claimed is:

1. A signalling system responsive to actuation of a speed control of a motor vehicle comprising a first and a second lamp mounted on the vehicle and visible from the exterior thereof, a first series circuit including the first lamp, a source of electromotive force for illuminating the lamp, and switch means having an actuation member mechanically coupled to the speed control of the vehicle, a second series circuit including the second lamp, the source of electromotive force, and the switch means, upon actuation of said speed control said switch means alternately closing the first series circuit and the second series circuit for a period of time less than five seconds, thereafter maintaining the first and second series circuits closed, and opening the first and second series circuits upon deactuation of the speed control.

2. A signaling system responsive to actuation of a motor vehicle speed control comprising a pair of lamps mounted on the vehicle in spaced relation and visible from the rear of the vehicle, a first series electrical circuit including a source of electromotive force, a first switch having an actuation member mechanically coupled to the speed control of the motor vehicle, a second electrical switch having an actuation member, and one of the lamps of said pair, a second series electrical circuit including the source of electromotive force, the first switch, a third electrical switch having an actuation member, and the second of the lamps of said pair, and means responsive to the closing of the first switch for alternately driving the actuation members of the second and third switches for a period of time less than five seconds, said means thereafter driving the actuation members of both the second and third switches until the first switch is opened.

3. A signaling system responsive to actuation of a motor vehicle speed control comprising the combination of claim 2 wherein the means for driving the actuation members of the second and third switches comprises a cam having a plurality of high sectors separated by low sectors, the actuation members of the second and third switches riding on the cam and closing the switches when disposed on a high sector and opening the switches when disposed on a low sector, said cam having a rest position in which the action members of the second and third switches rest on high sectors of the cam, and in all other positions of the cam one of said actuating members rides on a low sector of the cam, and motor means mechanically coupled to the cam and electrically coupled to the first switch for rotating the cam one complete revolution from its rest position responsive to closing of the first switch.

4. A signaling system responsive to actuation of a motor vehicle speed control comprising the combination of claim 3 wherein the motor means for rotating the cam comprises a solenoid connected in series with the first switch having a translatable armature, means spring biasing the armature to a rest position, a lever pivotally mounted between its ends having one end confronting the armature and the other end riding on the cam, said cam having a slot engaging the lever at the rest position of the cam, and means for applying rotational torque to the cam, whereby closing of the first switch translates the armature to engage the lever and release the lever from the slot in the cam, thus permitting the cam to rotate under control of the torque means.

5. A signaling system responsive to actuation of a motor vehicle speed control comprising the elements of claim 4 wherein the means for applying a rotational torque to the cam comprises a housing, a first spindle rotatably mounted on the housing, the cam being mounted on the first spindle for rotation therewith, a second spindle rotatably mounted on the housing parallel to the first spindle, an arm journaled at one end on the second spindle and mechanically linked to the armature at the other end, a disc journaled about the second spindle adjacent to the arm, a ratchet affixed to the disc between the disc and the arm, a pawl mounted on the arm engaging the ratchet permitting rotation of the disc in only one direction relative to the arm, a sleeve journaled about the second spindle, a spiral spring disposed about the sleeve having one end anchored on the sleeve and the other end anchored on the disc, a first spur gear mounted and secured on the sleeve, a second spur gear mounted and secured on the first spindle and meshed with the first spur gear, the ratio of the number of teeth on the first spur gear to the number of teeth on the second spur gear being equal to the ratio of the number of degrees of rotation of the disc for one translation of the armature to 360 degrees.

References Cited by the Examiner

UNITED STATES PATENTS

| | | | |
|---|---|---|---|
| 1,885,714 | 11/1932 | Hampton | 340—72 |
| 1,928,873 | 10/1933 | Acton | 340—72 |
| 3,164,803 | 1/1965 | Leichsenring | 340—69 |

NEIL C. READ, *Primary Examiner.*

THOMAS B. HABECKER, A. H. WARING,
*Assistant Examiners.*